United States Patent
Laturell

(10) Patent No.: US 7,512,114 B2
(45) Date of Patent: Mar. 31, 2009

(54) POTS/BROADBAND VOICE CROSS-CONNECT SYSTEM

(75) Inventor: Donald R. Laturell, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 971 days.

(21) Appl. No.: 10/243,235

(22) Filed: Sep. 13, 2002

(65) Prior Publication Data

US 2004/0052242 A1    Mar. 18, 2004

(51) Int. Cl.
  *H04L 12/66* (2006.01)
  *H04L 12/28* (2006.01)
  *H04M 11/00* (2006.01)
(52) U.S. Cl. .............. 370/352; 370/389; 370/395.2; 370/401; 279/91.02; 279/93.09; 279/93.14
(58) Field of Classification Search .......... 370/401, 370/352, 356, 389, 525, 526, 395.53, 260, 370/254, 270, 353, 400, 351, 354, 395.1; 379/17, 32.01, 45, 84, 93.01, 40, 93.07, 93.09, 379/93.14, 191
See application file for complete search history.

(56) References Cited

U.S. PATENT DOCUMENTS

| | | | | |
|---|---|---|---|---|
| 6,134,235 A | * | 10/2000 | Goldman et al. | 370/352 |
| 6,411,704 B1 | * | 6/2002 | Pelletier et al. | 379/230 |
| 6,445,682 B1 | * | 9/2002 | Weitz | 370/257 |
| 6,816,469 B1 | * | 11/2004 | Kung et al. | 370/260 |
| 7,103,151 B2 | * | 9/2006 | Lass et al. | 379/37 |

* cited by examiner

*Primary Examiner*—Hanh Nguyen
(74) *Attorney, Agent, or Firm*—Mendelsohn & Assoc., P.C.; Kevin M. Drucker; Steve Mendelsohn

(57) ABSTRACT

A communications apparatus supporting seamless integration of VoBB and POTS services can be used with or embodied in any communications appliance or voice/data gateway product that has connectivity to both services. The apparatus supports user-specified usage of one service over another on a call-by-call and/or call-category basis. For example, all long-distance outgoing calls (or those belonging to specific area codes or regions) may be specified to use the VoBB service and all local calls or just emergency "9-1-1" calls may be specified to use the POTS service. The apparatus also enables communication service features such as multiple-line (ML), three-way-calling (TWC), and conference calling (CC)) to be managed intelligently across the VoBB and POTS services.

24 Claims, 7 Drawing Sheets

POTS/BROADBAND VOICE CROSS-CONNECT SYSTEM

BACKGROUND OF THE INVENTION

1. Field of the Invention

The present invention relates to telecommunications and, more particularly, to voice-over-broadband networks and voice emergency systems.

2. Description of the Related Art

In conventional POTS (plain old telephone system) networks, analog telephones transmit and receive voice signals via a telephone company's local central office (CO). Recently, it has become possible to use various voice communication devices, including Internet protocol (IP) phones, appropriately configured PCs, as well as POTS analog phones, to send and receive voice calls over the Internet.

To send and receive calls over the Internet using POTS phones, transcoding must be performed between the analog signals associated with the POTS phones and the digital packetized signals used to carry voice calls over the Internet. In such a configuration, an analog telephone is typically connected to a voice-over-IP (VoIP) gateway via a POTS central office emulator (PCOE). The PCOE handles the analog interface to the POTS phone to make it appear to the POTS phone as if it is directly connected to a CO. This interface includes ring assertion, tip/ring powering, offhook/onhook detection, and dialtone generation. The PCOE passes analog signals between the POTS phone and the VoIP gateway. The VoIP gateway transcodes between analog signals associated with the PCOE and digital IP packetized signals compatible with the VoIP protocol. The VoIP gateway further interfaces the VoIP data to the Internet via a broadband access device such as a cable modem.

Service providers are building data-centric networks to support digital voice-over-broadband (VoBB) services (e.g., VoIP). However, to become a local exchange carrier (LEC), a service provider must comply with local regulations, including those that require them to offer emergency (e.g., 911) services to all subscribers.

While VoIP is now routinely deployed by LECs, the unchanged 911 tandems that handle emergency calls have fallen years behind the current technologies. Still widely in use, many 911 tandems do not support IP-based protocols, and these tandems continue to require trunking via multi-frequency (MF) tones. Complicating the matter is the protocol uniqueness of the operator services that 911 tandems supply. LECs face the dilemma of how to comply with mandatory 911 regulations without investing in expensive network upgrades. Meanwhile, 911 services remain unsupported for users of broadband voice.

While the LECs struggle with regulatory compliance, businesses and consumers continue to demand the features associated with broadband voice services offered by cable multiple system operators, competitive LECs (CLECs), satellite operators, and other broadband service providers. However, they also desire the reliability and emergency support afforded by their POTS service.

SUMMARY OF THE INVENTION

The problems in the prior art are addressed in accordance with the principles of the present invention by providing apparatus for selectively and automatically connecting voice-communicating customer premises equipment (CPE), such as—but not limited to—conventional analog POTS (plain old telephone system) phones, to either the central office (CO) of the local telephone company or to a broadband network, such as the Internet, or—in certain embodiments—both. Depending on the implementation, the apparatus determines how to connect the voice CPE at any given time based on a specified set of criteria. For example, in one implementation, the apparatus could be configured to connect a telephone to the Internet for all outgoing telephone calls except emergency calls initiated by dialing "9-1-1." In such an implementation, the apparatus could also be configured for incoming calls to selectively connect the telephone (1) to the CO to receive incoming POTS telephone calls and (2) to a voice-over-IP (VoIP) gateway on the customer's premises to receive incoming Internet telephone calls.

One embodiment of the apparatus supports seamless integration of voice-over-broadband (VoBB) and POTS services. It can be embodied in any communications appliance (e.g., next generation handset) or voice/data gateway product (e.g., broadband router or PC) that has connectivity to both services. It supports user-specified usage of one service over another on a call-by-call and/or call category basis. For example, all long-distance outgoing calls (or those belonging to specific area codes or regions) may be specified to use the VoBB service, while all local calls may be specified to use the POTS service. Alternatively, for a given long-distance call, the user may select (e.g., via "hookswitch flash," special dialing sequence, or voice command) the POTS service, while allowing all other long-distance calls to use the VoBB service. As another example, all outgoing calls other than emergency (e.g., 911) calls may be specified to use the VoBB service, while POTS support is provided for all incoming calls (given that many VoBB services today lack inbound service). Once configured, the system can also support transparent usage of VoBB versus POTS according to users' specifications and/or system defaults.

In one embodiment, the apparatus includes an enhanced cross-connect-element (XCE), situated between VoBB and POTS communications networks, that provides mixing and fully non-blocking cross-connect functionality to the apparatus of this invention.

The apparatus may support communication service features such as multiple-line (ML), three-way calling (TWC), conference calling (CC), mute, hold, caller-ID (CID), call-waiting (CW), call-waiting-ID (CWID), music-on-hold (MOH), telephone answering device (TAD), and relevant custom local area signaling services (CLASS) to be managed intelligently across the VoBB and POTS services. Enhanced features such as audible information services (AIS) (optionally available on hold), voice dialing, and voice control for both VoBB and POTS, may also be supported.

According to one embodiment, the invention is customer premises equipment (CPE). The CPE includes a cross-connect configured to selectively connect a local communication device with a plain old telephone system (POTS) central office (CO) or a voice-over-broadband (VoBB) gateway or both, and a controller configured to monitor signals corresponding one or more of the local communication device, the POTS CO, and the VoBB gateway, to control the cross-connect.

According to another embodiment, the invention is a method for processing communication signals at a customer's premises. According to the method, a local communication device is selectively connected with a plain old telephone system (POTS) central office (CO) or a voice-over-broadband (VOBB) gateway or both, and signals corresponding to one or more of the local communication device, the POTS CO, and the VoBB gateway, are monitored to control the selective connection.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
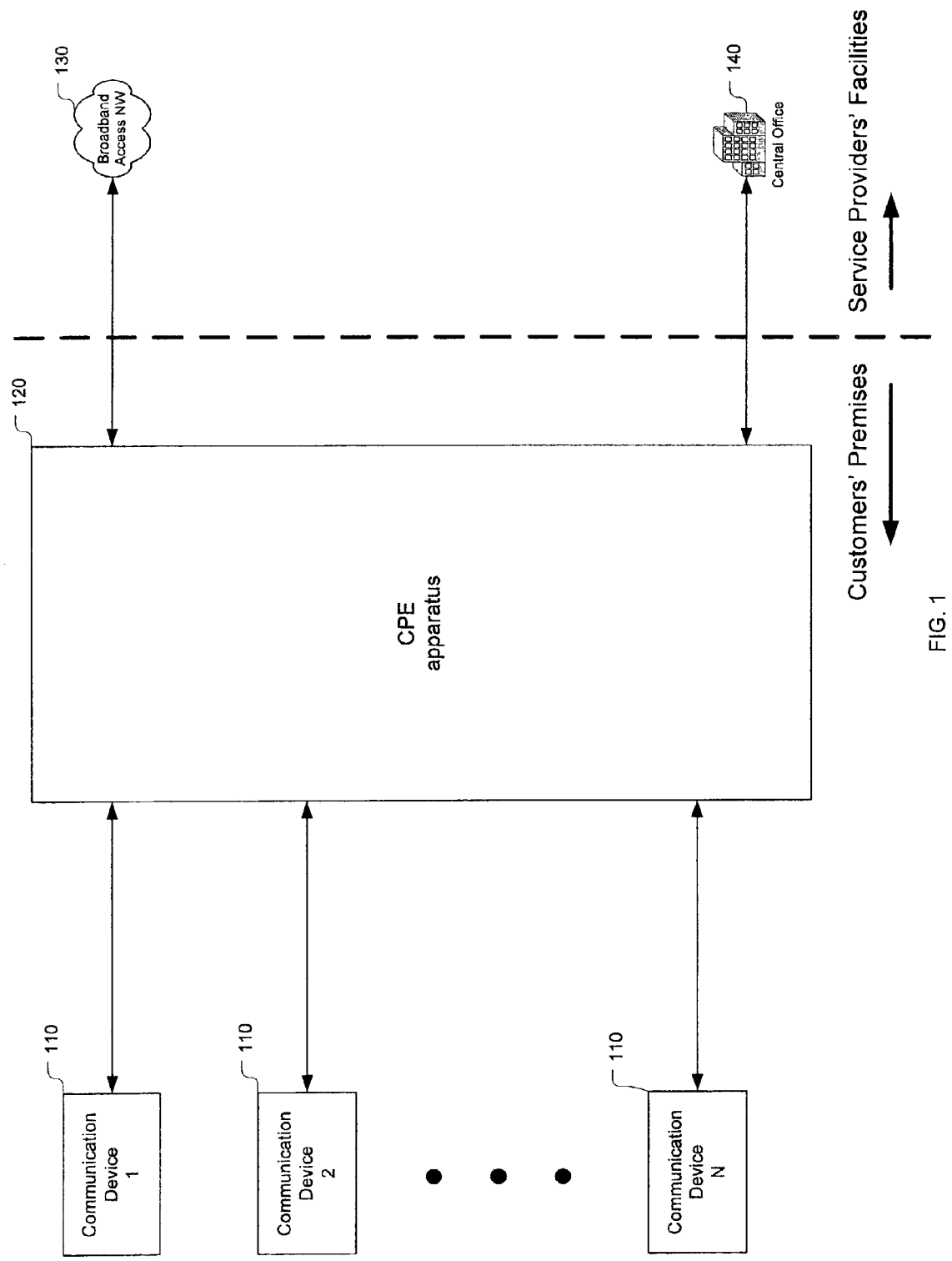
FIG. 1 is a block diagram of a generic telecommunications system in accordance with the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Classically, voice communication networks for the home and business environment were physically and electrically distinct from data communication networks. Additionally, requirements for emergency 911 call handling were met at a central office by a local exchange carrier using an "emergency tandem" that interfaced with the incumbent voice communication network via multi-frequency (MF) tones.

Today, however, IP networks are being used to carry both data and voice. Converged solutions for voice-over-broadband (VoBB) (e.g., H.323 over Digital Subscriber Line (xDSL)) have emerged which support basic voice communications functions (e.g., Q.2931 call control and signaling), many of the advanced custom local area signaling services (CLASS), and Switching System 7 (SS7) intelligent network features (e.g., call-waiting-ID, three-way calling), as well as some enhanced features such as multi-line and conferencing. However, these solutions fall short in the areas of reliability and support for emergency 911 features.

In today's typical emergency scenario, a competitive LEC (CLEC) provides voice and data services over an integrated access device (IAD) via a broadband connection. For example, when a caller makes an emergency 911 call, the call comes to the edge of a VoBB gateway (e.g., voice-over-IP gateway) over a transport technology, such as xDSL, via an IAD (e.g., combined multiport router and xDSL modem). The VoIP gateway, Media Gateway Controller (MGC), and associated service control platforms and protocols (i.e., MGCP) direct the call to the legacy 911 tandem. The Media Gateway converts and directs the bearer traffic and associated MF call control to the 911 tandems. At this point, incompatibility may occur between the media gateway and the 911 tandem, in which case, the 911 information exchange will fail.

Additionally, many phones that have been designed for emergency use by the elderly or people with certain medical conditions require a reliable, classical, POTS connection in order to operate properly. For example, there are phones that are designed to receive a wireless request to dial "9-1-1" as a result of a user pressing an "emergency" button on a specially designed pendant that is sold with the phone. Other phones with autodial and memory capability provide a special "emergency" button on the faceplate that is clearly marked and easy to access.

For these reasons, telecommunications customers find it necessary to retain a "lifeline" voice service via an incumbent local exchange carrier (ILEC) while separately maintaining an integrated VoBB and data network for their primary communication needs.

While retaining such a lifeline service (e.g., 2-wire POTS connection to a local central office) may be inexpensive, the lack of integration of this voice emergency service with the primary broadband voice communication service (i.e., VoBB) is inconvenient and can be dangerous in an emergency situation.

To address this problem, an apparatus in accordance with the present invention may be added to customer premises equipment. This apparatus helps integrate voice-over-broadband (VoBB) and plain old telephone system (POTS) communications.

FIG. 1 is a block diagram of a telecommunications system in accordance with the present invention. In particular, FIG. 1 shows the connections between customer premises equipment for a single household or office and both a LEC's central office 140 and a broadband access network 130, such as the Internet. The CPE includes one or more communication devices 110 that are selectively and automatically connected to CO 140 and/or BB access network 130 via CPE apparatus 120. The following sections describe different implementations of CPE apparatus 120 for different types of communication devices 110 and different types of telecommunications services.

Exemplary Relay Embodiment

Figure 2:
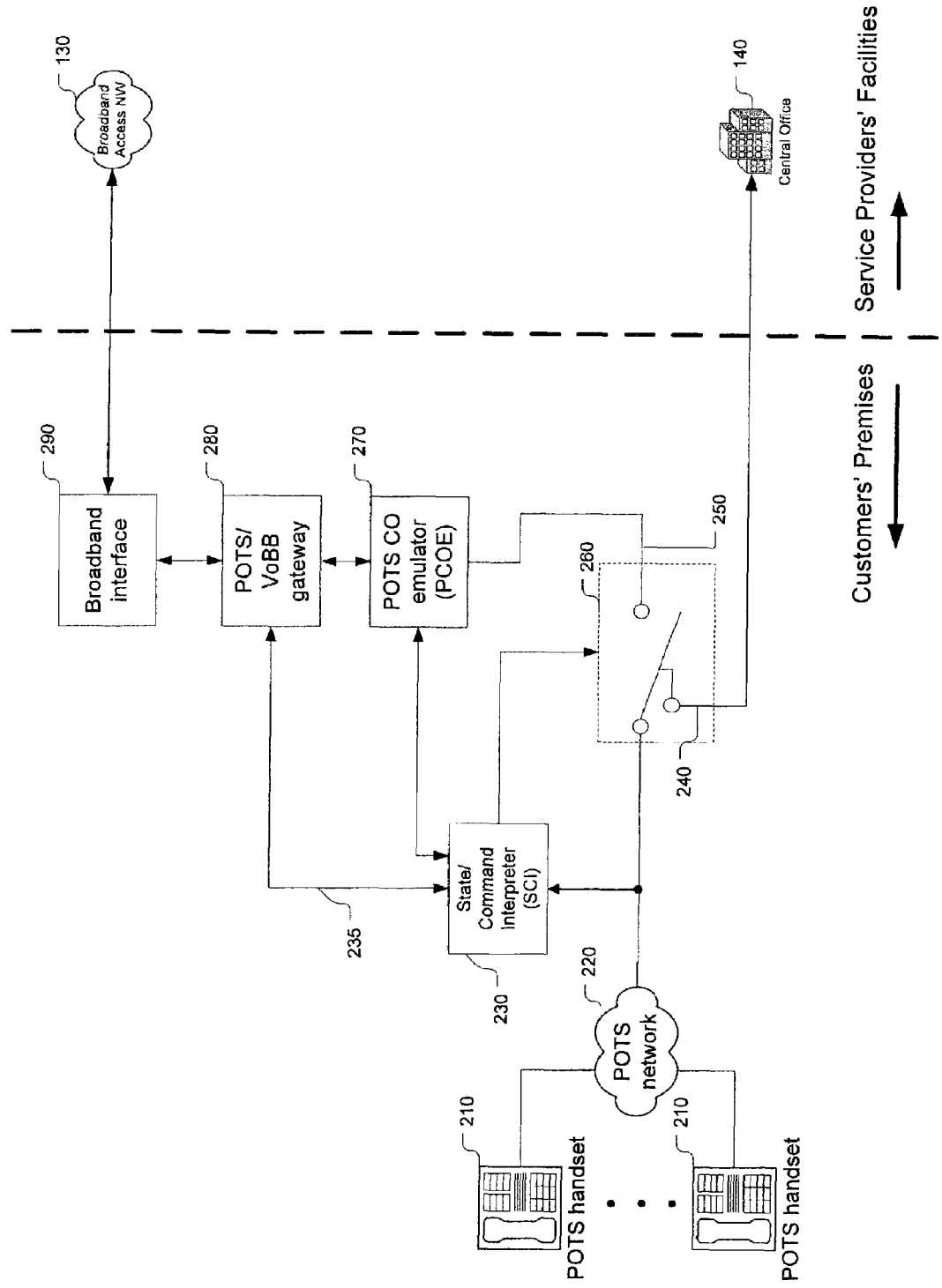
FIG. 2 is a block diagram illustrating a relay-based embodiment of the present invention.

One exemplary embodiment of the apparatus of this invention is illustrated in FIG. 2. In FIG. 2, CPE apparatus 120 of FIG. 1 includes relay 260 and state/command interpreter (SCI) 230. Depending on the implementation, CPE apparatus 120 may also include PCOE 270, POTS/VoBB gateway 280, and/or broadband interface 290.

FIG. 2 shows one or more POTS handsets 210 connected via POTS network 220 to relay 260. The default (e.g., unpowered position) terminal 240 of relay 260 provides a connection from handsets 210 to telephone central office (CO) 140, while the other terminal 250 provides connection from handsets 210 to PCOE 270. PCOE 270 is connected to POTS/VoBB gateway 280, which is connected via broadband interface 290 to broadband access network 130, which provides a voice gateway for the VoBB service bridging to the public switched telephone network. SCI 230 monitors POTS network 220 for in-band commands (e.g., special Dual-Tone- MultiFrequency (DTMF) sequences, pulse sequences, or spoken instructions) and/or line states (e.g., offhook or hookswitch "flash") that will affect the setting of relay 260. SCI 230 receives, processes, and interprets these commands and line states and then drives relay 260 to an appropriate position.

Note that POTS handsets 210 could be any combination of one or more communication devices (e.g., cordless phones or PC-based voice appliances) that ultimately access POTS network 220 using a standard POTS interface. One or more of POTS handsets 210 could be multi-line devices. POTS network 220 could be replaced with multiple POTS networks (i.e., multiple lines), and relay 260 and SCI 230 could be enhanced to handle appropriate switching of the multiple lines. A multiple-PCOE device could be used in place of PCOE 270, and multiple lines from the central office could be managed by appropriate additional enhancements to relay 260 and SCI 230.

POTS/VoBB Flash Toggle

Figure 3:
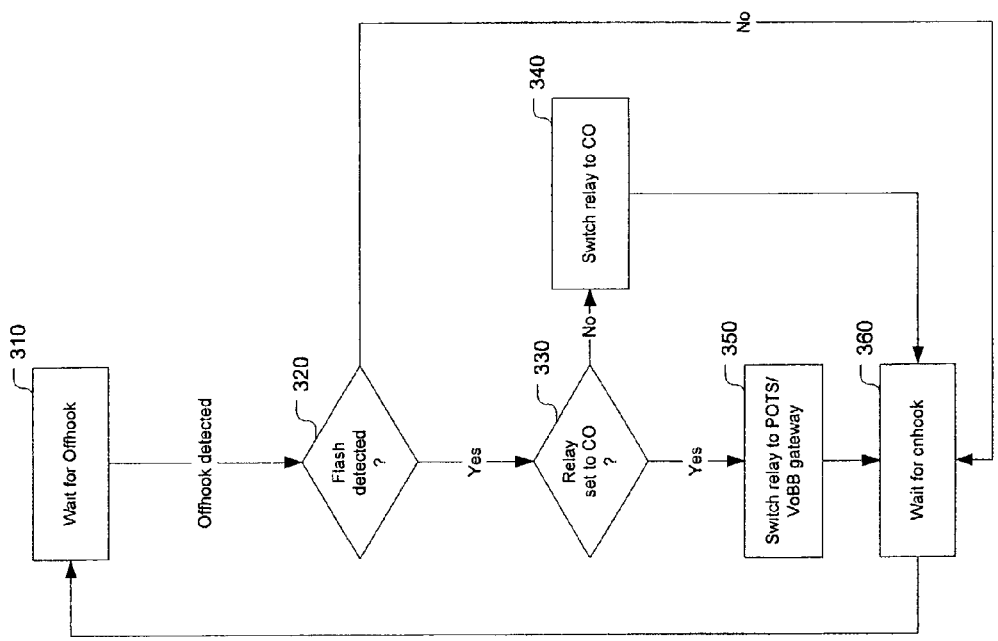
FIG. 3 is a flow chart of an exemplary procedure for relay control based on hookswitch flash according to an embodiment of this invention.

One implementation of SCI 230 of FIG. 2 is a toggle control based on hookswitch flash detection. For example, the user of a POTS handset 210 can change the connection provided by relay 260 by performing a hookswitch flash within a certain time period of taking the handset off hook. This implementation is illustrated by the flow diagram of FIG. 3 and the embodiment of FIG. 2. As illustrated in FIG. 3, the procedure starts in step 310 where it is assumed POTS handsets 210 are onhook and the procedure is waiting for an offhook line state on POTS network 220. If one or more of handsets 210 go offhook, then a test for a hookswitch flash is performed in step 320.

If a hookswitch flash is not detected within a time period T1 in step 320, then the procedure enters step 360 where it waits for an onhook state on POTS network 220. When (or if) handsets 210 are both eventually "hung up" (i.e., the onhook line state is detected on POTS network 220) the procedure returns to step 310.

If a hookswitch flash is detected within a time period T1 in step 320, then a further test is performed in step 330 to determine if relay 260 is currently connecting handsets 210 to central office terminal 240 of relay 260. If it is not, then relay 260 is switched to the CO connection (position 240 of FIG. 2) in step 340 and processing waits for an onhook line state in step 360. When (or if) handsets 210 are both eventually "hung up," the procedure returns to step 310.

If upon entering the test at step 330, the relay is already connected to CO terminal 240, then in step 350 relay 260 is switched to position 250 of FIG. 2 and handsets 210 are thus connected to PCOE 270 associated with POTS/VoBB gateway 280. The procedure then waits for onhook (i.e., call termination) in step 360, and then upon detection of an onhook state, returns to step 310.

This implementation could be accompanied by some means (e.g., tone and/or click, either periodic or initially after offhook) of notifying the user of the current relay connection. Alternatively, when the phone is onhook, the relay can be controlled by SCI 230 to always revert to the CO connection and upon hookswitch flash detection be forced to the VoBB connection. In this way, simply hanging up the phone will guarantee that the connection reverts to the CO connection. This, coupled with the default position of the relay when it is not powered, would provide a secure and reliable connection to the CO for emergency usage.

POTS/VoBB Flash Switch

Figure 4:
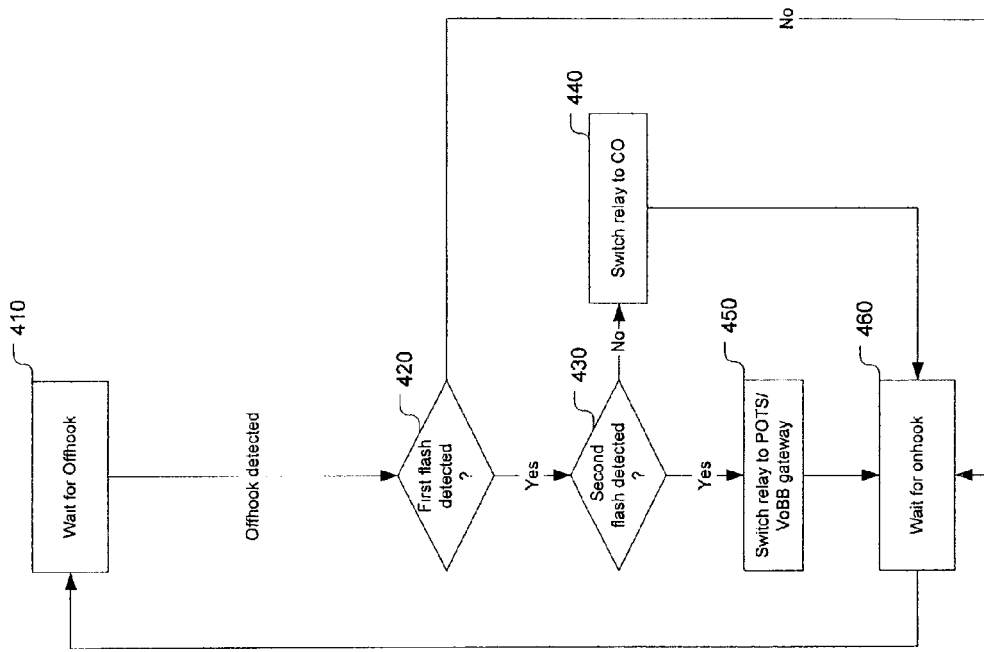
FIG. 4 is a flow chart of an alternative exemplary procedure including relay control based on hookswitch flash according to an embodiment of this invention.

FIG. 4 illustrates a different implementation for SCI 230 of FIG. 2. This arrangement allows the user to "command" the relay to a specific position (i.e., "connect to CO 140" or "connect to POTS/VoBB interface") rather than simply toggle between the two relay positions. This eliminates the ambiguity that may arise when the user of a handset 210 does not recall which position the relay was in last. In this example, as in the example of FIG. 3, the "command" is issued using only the hookswitch of a standard POTS phone. The implementation is illustrated by the procedure of FIG. 4 where in step 410 an offhook line state is waited for as in the procedure of FIG. 3. If an offhook state is detected in step 410, then in step 420, if a hookswitch flash is not detected within a certain period of time T1, the procedure continues to step 460 where it waits for an onhook line state and upon its detection it returns to step 410. However, if in step 420 a hookswitch flash is detected within time period T1, then in step 430, a check for a second flash occurs.

If a second flash is not detected in step 430 within a given amount of time, T2, from the occurrence of the first flash, then in step 440, relay 260 is connected to CO terminal 240 of FIG. 2. However, if the second flash is detected in step 430, then relay 260 is connected to PCOE terminal 250 of FIG. 2 in step 450. In either case the procedure then continues to step 460 where it waits for an onhook line state and upon its detection it returns to step 410.

Switch per DTMF Sequence

In the following discussion involving the example procedures of FIGS. 5 and 6, it is assumed that the default connection of relay 260 of FIG. 2 prior to the offhook state is towards the CO. In other words, every time POTS network 220 goes onhook, relay 260 is switched back to its default (i.e., unpowered) position of connection to terminal 240 of FIG. 2 and consequently, when network 220 subsequently goes offhook, any dialing that occurs is passed to CO 140.

Figures 5, 6:
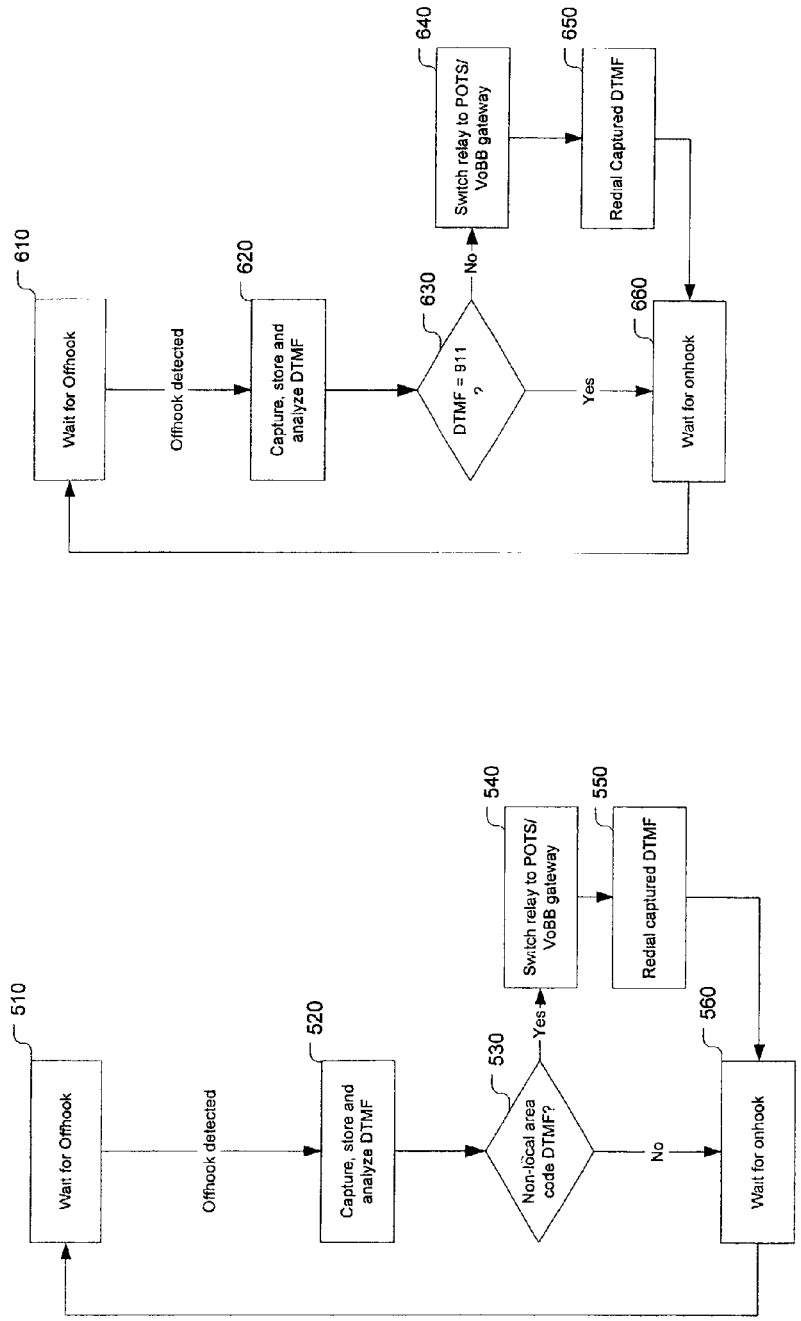
FIG. 5 is a flow chart of an exemplary procedure including relay control based on dialing sequence according to one embodiment of this invention.
FIG. 6 is a flow chart of an alternative exemplary procedure including relay control based on dialing sequence according to one embodiment of this invention.

FIG. 5 illustrates another implementation for SCI 230 of FIG. 2. In this implementation, it is assumed that SCI 230 has been initialized with the user's local area code, and it has been configured to use a VoBB connection for long distance calls and a CO connection for local calls. This configuration may be useful for people who have, for example, a low-cost VoBB service from their data provider, and unlimited local POTS service through their LEC. In step 510 offhook detection is achieved. If one or more of handsets 210 of FIG. 2 are offhook, then in step 520, DTMF (or alternatively pulse) digits subsequently dialed by the user of handsets 210 are captured, stored, and analyzed. Note that because relay 260 is in its default position (i.e., terminal 240) of connection to the CO, these digits are concurrently passed to the CO. A test is performed in step 530 to see whether the dialed DTMF digits correspond to a non-local area code (i.e., long distance area code). If no long distance number is detected in step 530, then in step 560 the procedure waits for call completion (i.e., onhook detection) before returning to step 510. If a long-distance area code is detected in step 530, then in step 540, relay 260 is set to connect the handsets (via POTS network 220) to PCOE 270 of FIG. 2 associated with POTS/VoBB gateway 280 (consequently breaking or effectively "hanging up" the CO connection), and in step 550 the DTMF digits previously stored by SCI 230 are passed to POTS/VoBB gateway 280 and dialed on a VoBB connection. Following this, in step 560 the procedure waits for onhook before returning to step 510.

Switch to CO on "911" Detect

FIG. 6 illustrates yet another implementation for SCI 230 of FIG. 2. As in the procedure of FIG. 5, it is also assumed here that the default connection of relay 260 prior to the offhook state is towards the CO. In this implementation, it is assumed that SCI 230 has been configured to use a VoBB connection for all calls other than emergency 911. This configuration may be useful for someone who has, for example, a low-cost VoBB service but wants to retain the reliability and utility of the local POTS system for emergency 911 calls. As illustrated by FIG. 6, in step 610, offhook detection is achieved. If one or more of handsets 210 of FIG. 2 are offhook, then in step 620, DTMF digits subsequently dialed by the user of handsets 210 are captured, stored, and analyzed. A test is performed in step 630 to see whether the dialed DTMF digits correspond to the local emergency access dialing sequence (e.g., "9-1-1"). If they do not, then in step 640, relay 260 is set to connect handsets 210 (via POTS network 220) to PCOE 270 associated with POTS/VoBB gateway 280 (consequently "hanging up" the CO connection), and in step 650 the DTMF digits previously stored by SCI 230 are passed to POTS/VoBB gateway 280 and dialed on a VoBB connection. Following this, or if it was determined in step 630 that "9-1-1" was dialed, in step 660 the procedure waits for onhook before returning to step 610.

Alternatively or in addition, other "special" sequences of DTMF (i.e., "touchtone") or "pulse" digits could be detected in step 630 of FIG. 6, and other actions taken based on that detection.

In the example procedures of FIGS. 5 and 6, as stated previously, it is assumed that the default connection of relay 260 prior to the offhook state is towards CO 140, and therefore, it is not necessary to reassert the dialed DTMF digits when the test of step 530 of FIG. 5 fails or when step 630 of FIG. 6 succeeds. One benefit of this is that no subsequent call connection delay is incurred if the call ultimately uses the CO connection.

Similarly, to minimize call setup delay if a call is intended to use the VoBB service, even if the default connection is towards CO 140, the captured DTMF digits can be passed concurrently toward POTS/VoBB gateway 280 from SCI 230 via interface 235. If the call ultimately goes to the VoBB service, the digits can have already been dialed on the VoBB service and call setup would already be underway. Whichever service is not ultimately going to support a given call is then "hung up." For example, once it is determined that a call is not for the VoBB service, that service is put onhook and call setup is cancelled on that service, while call setup on the CO service proceeds.

Note that in the illustrative procedures of FIGS. 3 through 6, certain steps, details of timing loops, delays, subroutines to debounce circuits or eliminate race conditions, and tests that might improve usability and multiple alternative implementations are not specifically illustrated or discussed but would be understood in this context to one skilled in the art.

Speech Commands

In alternative embodiments of this invention, in the procedures of FIGS. 3 and 4, the hookswitch flash sequence tests can be replaced or augmented with voice command detection routines. For example, a speech recognition circuit, embedded within SCI 230, (optionally with dial tone interference canceller) could be used to automatically detect a keyword phrase such as "call for help," and upon detection, automatically switch relay 260 to connect POTS network 220 with central office 140, and a DTMF dialer module (also embedded within SCI 230) may be used to dial "911" (or an alternative emergency DTMF sequence) automatically.

Similarly, in alternative embodiments, other voice command features including general voice dialing can also be enabled by appropriate support circuitry in SCI 230. For example, in one implementation of this invention, interface 235 is an IP-over-Ethernet connection capable of bidirectional Internet Protocol (IP) communication, and SCI 230 is provided with sufficient processing power and memory to support at least a basic (e.g., Simple Network Management Protocol (SNMP) or SNMP proxy) management interface. In this example, the management interface can be used to populate a dialing directory of names (e.g., phoneme library) and numbers via a remotely located PC (not illustrated). Following offhook detection, SCI 230 "listens" for spoken names (optionally preceded by a voice dialing prompt such as "please dial") and performs a speaker-independent voice recognition match against the names in its directory. Alternative implementations include storing the names and numbers in a remote device (e.g., networked PC) and having SCI 230 pass the voice information to the remote device for called party number lookup. In either case, once a match is established, SCI 230 coordinates the dialing of the DTMF digits corresponding to the matched name on either POTS or VoBB services, or optionally, if the match fails, has a voice message played back to the caller over POTS network 220 such as "no matching name found." Voice commands can be stored for many of the other functions of the apparatus including multiple line switching, hold, music on hold, audible information services (AIS), and conference calling.

Multiple-Line Switching

Certain embodiments of this invention support multi-line configurations. For example, assume POTS network 220 is merely a 2-wire (i.e., single line) network but the connection to terminal 240 of relay 260 from CO 140 is 4-wire (i.e., dual line). One embodiment of this invention supports switching connection of POTS network 220 between line "1" and line "2" of CO 140 via hookswitch flash, dialing sequence, voice, or other commands. This feature effectively enables a two-line mode on inherently single-line POTS handsets. This feature is useful, for example, when one or both of the CO lines are shared by conventional telephony devices (e.g., other POTS phones or a fax machine) which are connected to CO 140 directly (i.e., not through the apparatus of this invention, but instead connected to a point corresponding to one line, for example line "1", of terminal 250 of relay 260). If, for example, the default connection of relay 260 is from POTS network 220 to CO line "1" and a user picks up a handset 210 and determines (e.g., by hearing a fax tone or voices) that the line is already in use, he can issue a command (e.g., voice commands, hookswitch flash, and/or DTMF sequence) to SCI 230 from the handset that will switch his connection on POTS network 220 via relay 260 to CO line "2."

Similarly, since VoBB services typically provide multiple "logical" lines, if more lines are provided by the CO, then this line-switching feature can be extended to sequence through all available lines in the combination of CO lines and VoBB lines until a free line is found for the user of the handset (switching detail not illustrated).

Hold and Conferencing

Figure 7:
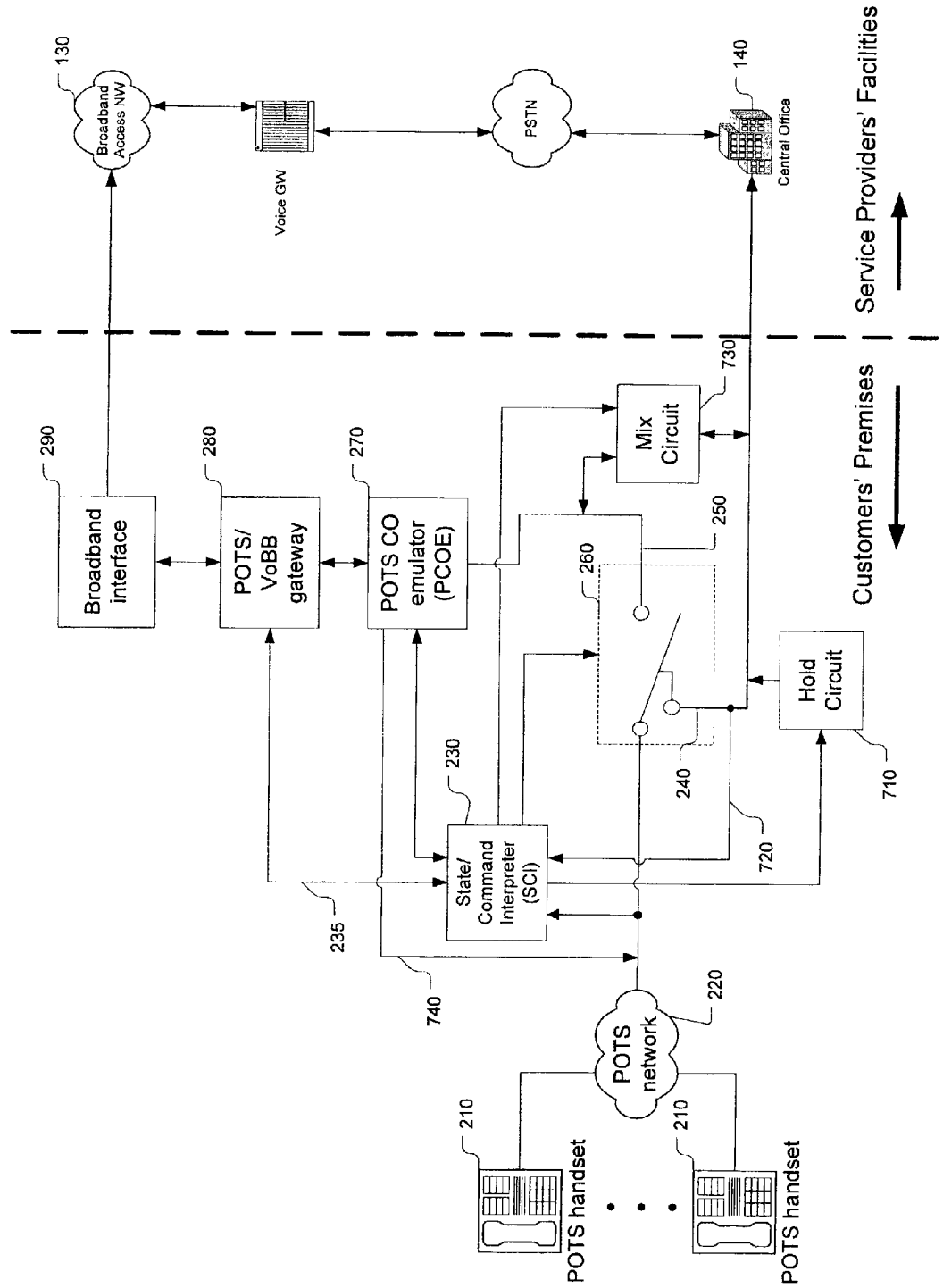
FIG. 7 is a block diagram illustrating an alternative embodiment of this invention.

An alternative embodiment of the apparatus of this invention is illustrated by FIG. 7 which illustrates the addition of hold circuit 710, sense connection 720, mix circuit 730, and PCOE output 740 to the customer premises portion of the embodiment illustrated by FIG. 2. Additionally, control signals from SCI 230 to hold circuit 710 and mix circuit 730 have been added.

Hold circuit 710 can be controlled via SCI 230 to assert offhook to the central office for the purpose of placing "on hold" a call that is currently underway via the CO connection, thus allowing a user of handsets 210 to switch relay 260 to position 250 to answer or initiate a VoBB call without "dropping" the CO call.

Mix circuit 730 can be controlled via SCI 230 to conference between VoBB call signals (which have been transcoded to the analog domain by POTS/VoBB gateway 280 and passed through PCOE 270) that are active on terminal 250 of relay 260, and POTS CO call signals that are active on terminal 240 of relay 260.

Sense connection 720 allows SCI 230 to monitor commands and line state of the CO connection even when relay 260 is not connecting POTS network 220 to CO terminal 240.

PCOE output 740 allows PCOE 270 to mix in or overlay certain emulated CO signals (e.g,. CW tone, ring, busy) to POTS network 220 when relay 260 is in position 240.

These additional elements, along with the other components of the solution, provide a series of features per various implementations including:

1. Placing a CO call on hold while answering or initiating a call via the POTS/VoBB gateway, and optionally injecting music or other audible information services (AIS) on hold to the on-hold party (via hold circuit 710)
2. Placing a VoBB call on hold via POTS/VoBB gateway 280, while answering or initiating a call via CO connection 240, and optionally injecting music or other audible information services (AIS) on hold to the on-hold VoBB party via POTS/VoBB gateway 280.
3. Three-way calling between local users of handsets 210, a caller on CO 140, and a caller on the VoBB service.
4. Conferencing local users of handsets 210 between a CO call and multiple VoBB calls.
5. When local users of handsets 210 are already participating in a conference call via CO 140, conferencing in one or more incoming and/or outgoing VoBB calls.
6. When local users of handsets 210 are already participating in a conference call via POTS/VoBB gateway 280, conferencing in one or more incoming and/or outgoing calls via CO 140.

Some exemplary scenarios follow.

Placing a CO Call on Hold

Assume the user of one of handsets 210 is currently engaged in a conversation via a POTS/VoBB gateway 280 when a call comes in via CO 140. SCI 230 detects the ring via sense connection 720 and then commands PCOE 270 to assert a call-waiting (CW) tone to POTS network 220 along with a CWID inband signal. The user hears the CW tone and decides to "take" the CO call by asserting a hookswitch flash via his handset. In this example, it is assumed that the user does not know or care whether the new call is a VoBB call or a CO call, although in some implementations this information can be communicated to the user, if important, via any of a number of different inband signaling techniques (e.g., a special tone or a voice message such as "call waiting from central office"). Upon detecting the hookswitch flash in the current context, SCI 230 commands hold circuit 710 to go offhook to CO 140 and commands relay 260 to switch the POTS network connection to the VoBB service path via connection to terminal 250. Optionally, hold circuit 710 can periodically insert an "on hold" tone or music to the CO caller to alert him to the continuation of the hold condition and/or keep him entertained during this waiting interval. Also, optionally, via an interface (not illustrated) between POTS/VoBB gateway 280, mix circuit 730, and SCI 230, connection to an online (i.e., network or Internet hosted) or locally implemented (e.g., via additional embedded hardware in SCI 230 and/or POTS/VoBB gateway 280) voice navigable audible information service can be provided for the caller on hold. Implementation of such an audible information service can also optionally be supported more generally within the invention such that a user of handsets 210 could simply pick up his phone and via a particular command, request connection to voice navigable audible information services.

POTS/VoBB Conferencing

The elements of this invention illustrated by FIG. 7 can also support CW, CWID, and conferencing between POTS network 220, central office 140, and POTS/VoBB gateway 280. This is illustrated by the exemplary procedures of FIGS. 8 and 9 relative to the embodiment of this invention per FIG. 7.

Ring on VoBB

Figure 8:
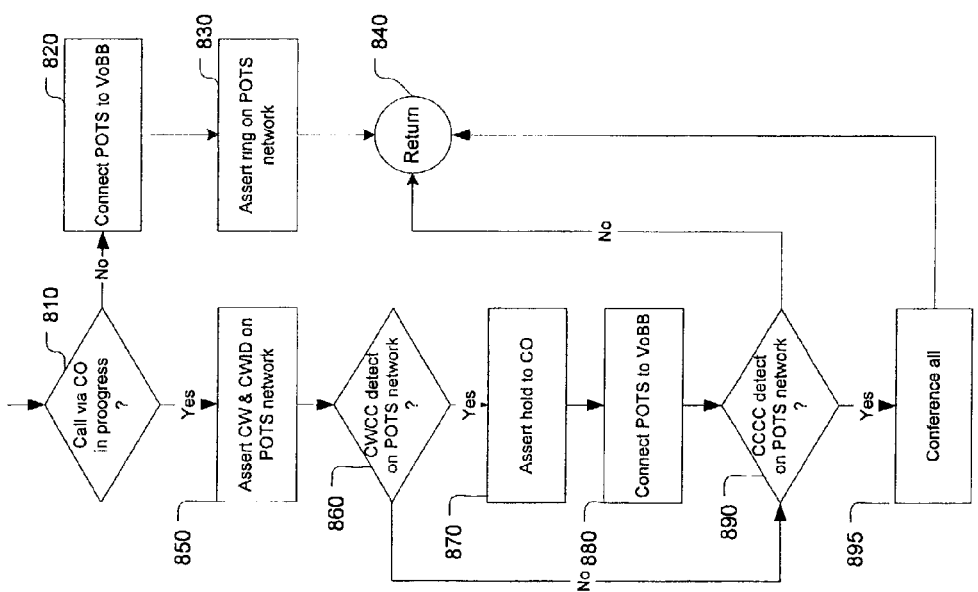
FIG. 8 is a flow diagram of an exemplary procedure including cross-connect element (XCE) control given a ring condition on a voice-over-broadband (VoBB) service.

In this example, a call comes in to one of the customer's local exchanges via POTS/VoBB gateway 280 from an outside caller, and a ring (i.e., a call connection request) is passed to SCI 230 by POTS/VoBB gateway 280 causing the invocation of routine "Ring on VoBB" illustrated by FIG. 8. In step 810, a call state register is read to check the current progress of calls on the various services. If there is no call in progress on POTS network 220 via central office 140, then in step 820 relay 260 is instructed by SCI 230 to connect POTS network 220 with PCOE 270 via terminal 250, in step 830 a ring is asserted by PCOE 270 on POTS network 220, and in step 840 the routine returns to its calling routine.

However, if in step 810 it is determined that at least one handset 210 on POTS network 220 is currently involved in a call via central office 140, then in step 850, PCOE 270 is instructed by SCI 230 to assert a call-waiting (CW) tone and CWID in-band signal on POTS network 220 via output 740. The user may respond to the CW tone with a CW Connect Command (CWCC) (e.g., a single hookswitch flash). If a CWCC is detected in step 860, then in step 870 a hold is asserted to central office 140 using hold circuit 710, and in step 880, connection is established by SCI 230 controlling relay 260 to connect POTS network 220 to POTS/VoBB gateway 280 via terminal 250.

Following step 880, or if no CWCC command is detected at step 860, at step 890, POTS network 220 is monitored for a Conference Call Connect Command (CCCC) (e.g., a double hookswitch flash). If a CCCC is detected at step 890, then in step 895, mix circuit 730 is instructed by SCI 230 to conference POTS network 220, central office 140, and POTS/VoBB gateway 280, thereby creating a three-way conference call, and in step 840, the routine returns. If no CCCC is detected at step 890, then in step 840 the routine returns. This VoBB-to-POTS conference calling or bridging capability can co-exist with any independent VoBB or POTS conference calling features that previously existed on either system, and can merge the best features of each into an enhanced system for the user of this invention.

Ring on CO

Figure 9:
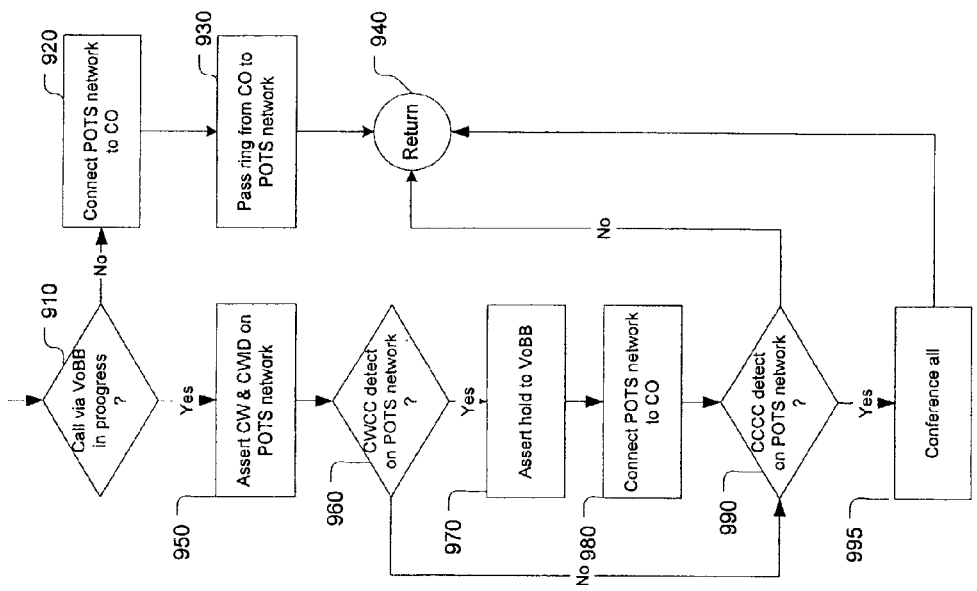
FIG. 9 is a flow diagram of an exemplary procedure including cross-connect element (XCE) control given a ring condition on a central office (CO) service.

Similarly, a symmetrical solution for CW and CC exists for when a call is in progress with one or more of handsets 210 on POTS network 220 using POTS/VoBB gateway 280, as illustrated by FIG. 9. In this case, a call arrives via central office 140, and a ring is detected by SCI 230 causing the invocation of the routine "Ring on CO" illustrated by FIG. 9. In step 910 a call state register is read to check the current progress of calls on the various services. If there is no call in progress via POTS/VoBB gateway 280, then in step 920, relay 260 is instructed by SCI 230 to connect POTS network 220 with CO 140 via terminal 240, in step 930 the ring from CO 140 is passed through to POTS network 220, and in step 940 the routine returns to its calling routine.

However, if in step 910 it is determined that at least one handset 210 on POTS network 220 is currently involved in a call via POTS/VoBB gateway 280, then in step 950, PCOE 270 is instructed by SCI 230 to assert a call-waiting (CW) tone and a CWID in-band signal on POTS network 220. The user may respond to the CW tone with a CW Connect Command (CWCC) (e.g., a single hookswitch flash). If a CWCC is detected in step 960, then in step 970 a hold is asserted to the VoBB call under control of SCI 230 by POTS/VoBB gateway 280, and in step 980, connection is established by SCI 230 controlling relay 260 to connect POTS network 220 to CO 140 via terminal 240.

Following step 980, or if no CWCC command is detected at step 960, at step 990, POTS network 220 is monitored for a Conference Call Connect Command (CCCC) (e.g., a double hookswitch flash). If a CCCC is detected at step 990, then in step 995, mix circuit 730 is instructed by SCI 230 to conference POTS network 220, central office 140, and POTS/VoBB gateway 280, thereby creating a three-way conference call, and in step 940, the routine returns to its calling routine. If no CCCC is detected at step 990, then in step 940 the routine returns.

In the previous examples, CW and/or conference call termination as well as conference call origination have not been explicitly illustrated. However, one skilled in the art, given the context of this invention, will recognize that many different techniques can be used to implement these features.

It should also be understood that in a similar fashion, communication service features such as multiple-line (ML), three-way-calling (TWC), conference calling (CC), mute, hold, caller-ID (CID), call-waiting (CW), call-waiting-ID (CWID), music on hold, and relevant Custom Local Area Signaling Services (CLASS) can be managed intelligently across the VoBB and POTS services with this invention.

It should also be noted that some implementations may require additional isolation circuits between the CPE apparatus of this invention and CO 140 to avoid improper use of telephone company lines.

Audible Information Services (AIS)

More advanced embodiments extend the voice dialing capability described previously to audible information services and optionally home control services. For example, in one embodiment, speech is passed from SCI 230 via communication interface 235, through POTS/VoBB gateway 280 to the Internet where a voice-activated audible information service client (not shown), such as TellMe Networks "TellMe" or VoiceXML (Voice eXtensible Markup Language) client, is accessed, and information, such as news, weather, time, sports scores, stock quotes, movie reviews, and movie times, is retrieved by the users of handsets 210.

Multiple Lines, IP, and HPNA

Figure 10:
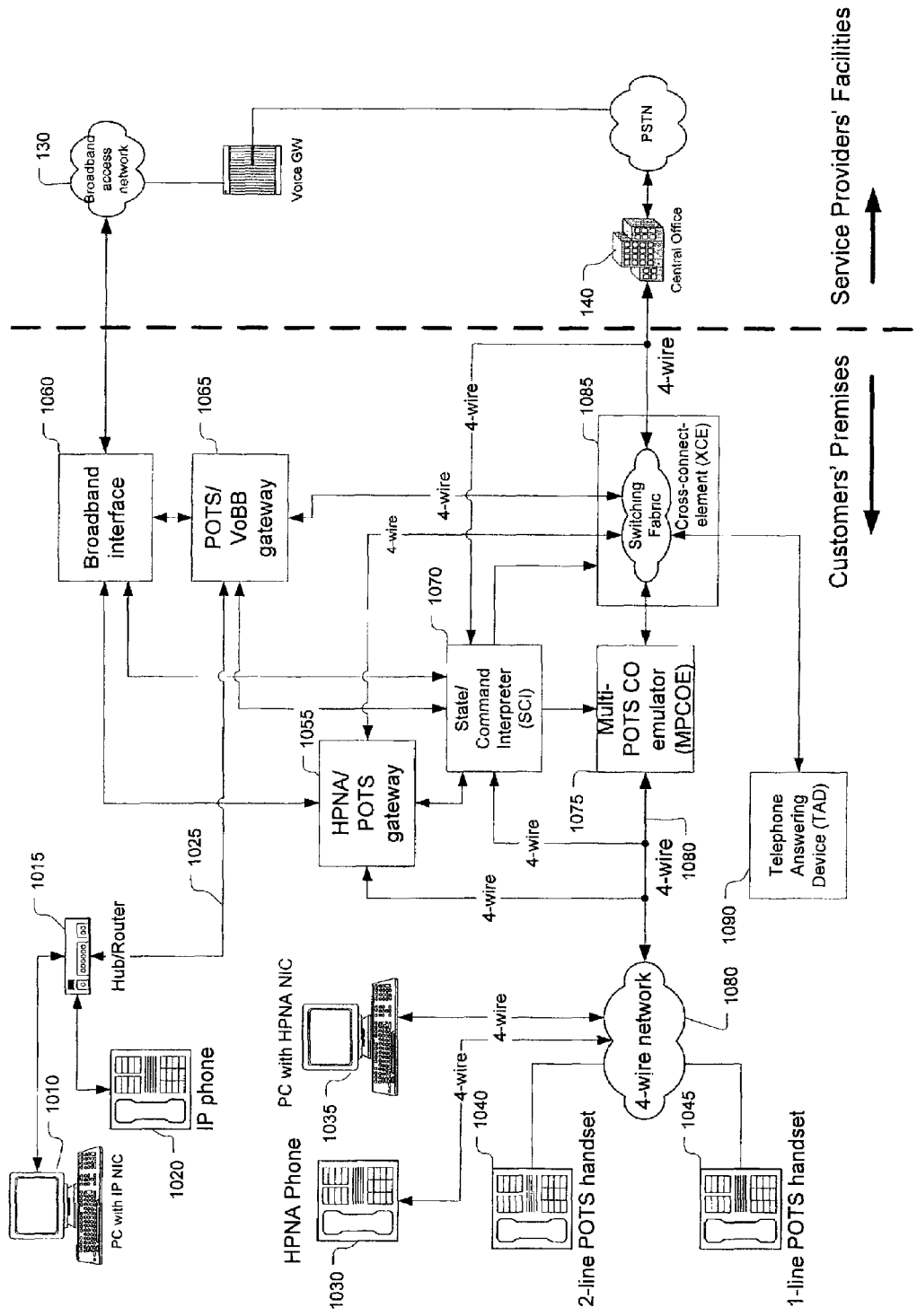
FIG. 10 is a block diagram illustrating another embodiment of this invention highlighting IP, POTS, and HPNA based voice devices, and IP and HPNA data communication devices.

FIG. 10 illustrates another embodiment of this invention where the relay 260 of FIGS. 2 and 7 has been replaced with the more comprehensive cross-connect element (XCE) 1085, and some elements have been enhanced and rearranged to provide additional control of the customer premises communication device user experience (e.g., PCOE 270 of FIG. 7 is now multiple-line PCOE (MPCOE) 1075).

As illustrated, POTS handsets 1040 and 1045 share 4-wire network 1080 where 2-line POTS handset 1040 has connections to both the first and second lines (i.e., both tip-ring (TR) pairs) of 4-wire network 1080, and 1-line POTS handset 1045 is connected to only line "1" of 4-wire network 1080. A multi-line PCOE (MPCOE) 1075 terminates POTS lines "1" and "2," and SCI 1070 monitors both POTS lines for line state and commands. XCE 1085 additionally includes a port for routing unanswered calls from either CO 140 or POTS/VoBB gateway 1065 and/or from one or more of the customer premises communication devices, including POTS handsets and/or VoIP devices (including VoIP-over-HPNA, VoIP-over-Ethernet, and PC telephony devices), to external or embedded telephone answering device (TAD) 1090.

Also sharing 4-wire network 1080 are Home Phone Network Alliance (HPNA) phone 1030 and PC 1035 with an HPNA network interface card (NIC). Each of these devices typically includes a "line selector" with which a user can configure which of the two lines the devices will use for their communications. In this example, both devices have been configured to use line "1."

The HPNA specification supports the networking of IP devices by providing Media Access Control (MAC) and PHYsical (PHY) layers that utilize Digital Spread-Spectrum (DSS) and Frequency Division Multiple Access (FDMA) techniques applied to a 2-wire physical medium. The standard allows multiple HPNA devices to share the spectrum on a 2-wire physical medium and effectively communicate with each other using IP protocol, or via a gateway, communicate with other IP devices on a local or wide area network. In this example, an HPNA NIC is configured to allow PC 1035 to communicate IP data over line "1" of 4-wire network IC to HPNA/POTS gateway 1055.

An HPNA phone makes use of the HPNA standard by encapsulating digitized voice and call signaling in IP packets per standard protocols (e.g., Q.2931 and H.323) and utilizing an integrated HPNA NIC for IP communications. An HPNA phone or NIC can share a traditional 2-wire telephony network with a POTS phone because the DSS FDMA scheme employed by HPNA operates in a frequency band above that used by analog voice communications (i.e., above 3 kHz). In this example, HPNA phone 1030 is configured to communicate voice-over-IP (VOIP) data using HPNA over line "1" of 4-wire network 1080 to HPNA/POTS gateway 1055.

Within HPNA/POTS gateway 1055, non-VoIP data (e.g., file uploads to the Internet from PC 1035) is further networked by conventional means (e.g., IP-over-Ethernet) to broadband interface 1060, and from there it is further networked to broadband access network 130. However, VoIP data may or may not be treated in a similar fashion, depending on its embedded line state (i.e., initiating call, on hold, etc.,) and the overall state of the apparatus.

Generally in this embodiment, VoIP traffic from HPNA devices is reassembled from the IP layer and analyzed by SCI 1070 for line state (e.g., offhook) and embedded commands (e.g., hookswitch flash, special DTMF sequences, and/or speech commands). Alternative embodiments can utilize different levels of reassembly of the voice and call control data. For example, in one alternative embodiment, voice samples are extracted and suppressed silence periods are expanded out to produce a synchronous digital stream corresponding to the voice channel originally embedded in the VoIP data stream. Additionally, in that embodiment, it is assumed that call state data (e.g., on/off hook, hookswitch flash, multiple line requests, and caller-ID) that in a typical VoIP communication is carried in a signaling sideband (e.g., per q.2931 and/or H.323), is communicated in an information side channel to SCI 1070 from HPNA/POTS gateway 1055. However, in the exemplary embodiment of FIG. 10, it is assumed that a fully POTS-compliant analog loop signal is developed by HPNA/POTS gateway 1055 and passed to SCI 1070 for analysis. This signal is then also optionally connected to one port of the switching fabric of XCE 1085 over one pair of the 4-wire connection between HPNA/POTS gateway 1055 and XCE 1085 for routing, mixing, multicasting, etc., according to control from SCI 1070.

FIG. 10 also illustrates a typical IP network of PC 1010 with an IP NIC hubbed and routed along with IP phone 1020 via Hub/Router IU. In this embodiment, however, uplink connection IY is connected to POTS/VoBB gateway 1065 instead of directly to broadband interface 1060 as would be expected from the prior art.

Within POTS/VoBB gateway 1065, non-VoIP data (e.g., file uploads to the Internet from PC 1010) is further networked by conventional means (e.g., IP-over-Ethernet) to Broadband Interface 1060, and from there it is further networked to broadband access network 130. However, VoIP data may or may not be treated in a similar fashion, depending on its embedded line state (e.g., initiating call, on hold, etc.) and the overall state of the apparatus.

Generally, and similarly to the handling of VoIP data from HPNA devices previously discussed, in this embodiment, VoIP traffic from IP devices is reassembled from the IP layer and analyzed by SCI 1070 for line state (e.g., offhook) and embedded commands (e.g., hookswitch flash, special DTMF sequences, and/or speech commands). Alternative embodiments can utilize different levels of reassembly of the voice and call control data as discussed previously with respect to VoIP data handling in HPNA/POTS gateway 1055. However, in the embodiment of FIG. 10, it is assumed that a fully POTS-compliant analog loop signal is developed by POTS/VoBB gateway 1065 and passed to SCI 1070 for analysis. It is also optionally concurrently connected to the switching fabric of XCE 1085 over one pair of the 4-wire connection between POTS/VoBB gateway 1065 and XCE 1085 for routing, mixing, multicasting, etc., according to control from SCI 1070.

SCI 1070 thus has the line state and command information for all potential IP and analog calls in the customer's premises. It also has control over all interconnects available to XCE 1085, which, in this implementation, is a fully non-blocking cross-connect built around a switching fabric with point-to-multipoint as well as mixing capability on all ports. Similarly MPCOE 1075 in this embodiment has the ability to emulate multiple analog CO signals for both 4-wire network 1080 as well as all ports of XCE 1085. Alternatively or additionally, CO emulation for HPNA and VoBB services can be provided at POTS/HPNA gateway 1055 and POTS/VoBB gateway 1065, respectively.

It should be understood to one skilled in the art that this arrangement supports a great many features including local intercom and conferencing services between local POTS, HPNA, and IP phones in addition to remote VoIP and/or POTS sourced communications.

Conclusion

Embodiments of the present invention support seamless integration of VoBB and POTS services. The present invention can be used with and/or embodied in any communications appliance (e.g., next generation handset) or voice/data gateway product (e.g., broadband router or PC) that has connectivity to both services. The present invention supports user-specified usage of one service over another on a call-by-call and/or call-category basis. For example, all long-distance outgoing calls (or those belonging to specific area codes or regions) may be specified to use the VoBB service and all local calls may be specified to use the POTS service. Alternatively, for a given long-distance call, the user may select (e.g., via hookswitch flash, special dialing sequence, special inband signaling command, or voice command) the POTS service while allowing all other long-distance calls to use the VoBB service. As another example, all outgoing calls other than emergency (e.g., 911) calls may be specified to use the VoBB service, while POTS support is provided for all incoming calls and for emergency outgoing calls. Once configured, the system supports transparent usage of VoBB versus POTS according to users' specifications and/or system defaults. The present invention also enables communication service features such as multiple-line (ML), three-way-calling (TWC), conference calling (CC), mute, hold, caller-ID (CID), call-waiting (CW), call-waiting-ID (CWID), and relevant custom local area signaling services (CLASS) to be managed intelligently across the VoBB and POTS services. Enhanced features, such as audible information services (AIS) (optionally available on hold), voice dialing, and command for both VoBB and POTS, are also enabled.

Exemplary Features

Some of the features provided by one or more of the embodiments of this invention include:

1. Using standard POTS handsets and/or VoIP devices (i.e., IP phones, cordless phones, HomeRF phones, PCs using IP telephony services, VoIP over wireless LAN and wireless access point, and VoIP-over-HPNA devices, etc.) to select between a CO connection and VoBB connection by issuing commands via the handsets or devices (e.g., hookswitch flash, DTMF, voice, or, in the case of VoIP devices, special in-band messages).
2. Automatically selecting between a CO connection and a VoBB connection based on dialing sequence, inband commands, and system state in consideration of user-configurable parameters and defaults for the system. For example, always selecting a CO connection for all emergency (e.g., "9-1-1" dialing sequence) calls, while passing all other calls to the POTS/VoBB gateway.
3. Conferencing between local POTS handsets and/or VoIP devices, along with parties communicated to, via a POTS/VoBB gateway and/or a CO.
4. Providing intercom services between local POTS handsets and/or VoIP devices.
5. Allowing POTS handsets and/or VoIP devices to access audible information services including music, voice dialing, and voice home control command, either (a) locally supplied via embedded facilities or (b) via access to local or remote networked resources such as audio information clients and/or voice-XML servers.
6. Placing a CO call on hold while answering or initiating a call via a POTS/VoBB gateway, and optionally supporting hold reminder, music, or other audible information services (AIS) for the on-hold party.
7. Placing a VoBB call on hold via a POTS/VoBB gateway, while answering or initiating a call via a CO connection, and optionally supporting hold reminder, music, or other AIS services for the on-hold party.
8. Three-way calling between users of local handsets, a caller on a CO connection, and a caller on a VoBB connection.
9. Conferencing users of local handsets between a CO call and multiple VoBB calls.
10. Conferencing users of local handsets between a three-way call already in progress via a CO TWC feature and a VoBB call.
11. Conferencing users of local handsets between a conference call already in progress via a POTS/VoBB gateway VoIP feature and a call via a CO connection.
12. Conferencing users of local handsets between a conference call already in progress via a POTS/VoBB gateway VoIP feature and a three-way call via a CO connection TWC feature.
13. Using standard POTS handsets and/or VoIP devices to select between multiple CO and/or VoBB connections by issuing commands via the handsets or devices (e.g., hookswitch flash, DTMF, voice, or, in the case of VoIP device, special inband messages).
14. Translating a call connect request (e.g., "ring") coming in from any CO connections or VoBB connections to a customer premise's local exchange to a ring on appropriate devices in the customer premises, be they POTS or VoIP handsets, according to preset parameters and logical groupings of communication devices configured at the SCH.

15. Routing unanswered incoming calls from the CO, POTS/VoBB gateway, or one or more of the customer premises communication devices including POTS handsets and/or VoIP devices (including VoIP-over-HPNA and VoIP-over-Ethernet and PC telephony devices) to an external or embedded telephone answering device (TAD).

16. Providing a battery backup for continuation of operation of all, or the most critical of the functions of the system in the event of a power failure including, at a minimum, support for connection to CO for emergency calls. Alternatively, or additionally, providing a backup relay-based connection for power failure situations, that provides connection between POTs phones and the CO in the event of (i) a failure of the externally supplied power to the system or (ii) a failure of the internal power related components of the system including switching power supply, DC/DC converters, power capacitors, and power supply interconnect.

Although specific examples were used in this disclosure, one skilled in the art will recognize the broad applicability of this invention. In particular, the POTS handsets and VoIP devices provide examples of a much broader category of communication devices that apply to this invention and include, in addition to the examples cited, analog and digital PBX systems, cordless phones, HomeRF phones, and cell phones. Additionally, "inband signaling" should be understood to include any means compatible with the interfaces of the communicating devices for sending and receiving commands. This should include, but not be limited to, DTMF or pulse dialing sequences, special tones, voltage changes, current interruptions or injections, chirps, spread spectrum techniques, voice commands, and combinations of the aforementioned. Additionally, the receivers for emergency dialing systems such as pendant-phone combinations which have a unique signaling from pendant to phone, can be integrated into this product. Incorporation of such multiprotocol receivers for such pendant RF and signaling implementations provides this invention with the feature of "universal emergency pendant receiver." This allows those wearers of the "universal" emergency pendants to have access to emergency dialing wherever a unit of this invention is within signaling distance. Also, broadband access includes cable modem, xDSL, satellite, radio/cellular, fiber optic, cable, T1, T3, and higher-order multiplexes. Additionally VoBB generally refers to any means to support voice over a broadband interface and includes VoIP over various media access and physical layers, voice over asynchronous transfer mode (ATM), and voice over fiber distributed data interface (FDDI).

The present invention may be implemented as circuit-based processes, including possible implementation as a single integrated circuit, a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims. As used in the following claims, the term "cross-connect" refers to any suitable device that connects one or more CPE communications devices with CO and/or VoBB services, including relay 260 of FIGS. 2 and 7 and cross-connect element 1085 of FIG. 10.

What is claimed is:

1. Customer premises equipment (CPE), comprising:
   (a) a cross-connect configured to selectively connect a local communication device with a plain old telephone system (POTS) central office (CO) or a voice-over-broadband (VoBB) gateway or both; and
   (b) a controller configured to (i) monitor one or more user-initiated signals provided by the local communication device and (ii) based on the one or more user-initiated signals, determine whether to connect the local communication device with the POTS CO or the VoBB gateway or both,
   wherein the controller is adapted to determine whether to connect the local communication device to the POTS CO or to the VoBB gateway or both based on one or more voice commands provided to the local communication device, the one or more voice commands spoken by a user and processed by speech recognition.

2. The invention of claim 1, wherein the controller's responses to the one or more user-initiated signals are configurable.

3. The invention of claim 1, wherein:
   the local communication device is a POTS phone;
   the CPE further comprises a POTS/CO emulator (PCOE) configured between the POTS phone and the VoBB gateway to support communications between the POTS phone and the VoBB gateway; and
   the CPE is implemented as a single integrated circuit.

4. The invention of claim 1, wherein the controller is adapted to determine whether to connect the local communication device to the POTS CO or to the VoBB gateway or both based on one or more Dual-Tone-Multi-Frequency (DTMF) signals from the local communication device.

5. The invention of claim 4, wherein the controller is adapted to control the cross-connect to connect the local communication device to the POTS CO when the one or more user-initiated signals from the local communication device correspond to the dialing of a 9-1-1 sequence on the local communication device.

6. The invention of claim 4, wherein the controller is adapted to control the cross-connect to connect the local communication device to the POTS CO for local calls and to the VoBB gateway for long-distance calls.

7. The invention of claim 1, wherein the cross-connect has a loss-of-power default configuration such that, when power supply to the VoBB gateway is lost, the local communication device is connected to the POTS CO.

8. The invention of claim 1, wherein the cross-connect has a default configuration to connect to either the POTS CO or the VoBB gateway based on an on-hook status of the local communication device.

9. The invention of claim 1, wherein the cross-connect is adapted to support simultaneous connection of the local communication device with both the POTS CO and the VoBB gateway.

10. The invention of claim 1, wherein the cross-connect is adapted to support local conferencing of local communication devices with one another.

11. The invention of claim 1, wherein the controller is further adapted to determine whether to connect the local communication device to the POTS CO or to the VoBB gateway or both based on one or more signals from at least one of the POTS CO and the VoBB gateway.

12. The invention of claim 11, wherein, if (i) there is no call already in progress and (ii) an incoming call arrives from either the POTS CO or the VoBB gateway, then the controller is adapted to control the cross-connect to connect the local communication device to answer the incoming call.

13. The invention of claim 11, wherein the controller, upon detecting an incoming call from the CO while the local communication device is in a current call via the VoBB gateway, is adapted to assert a call-waiting (CW) tone to the local communication device.

14. The invention of claim 13, wherein the controller further is adapted to respond to a call-waiting connect command (CWCC) from the local communication device by (i) commanding the VoBB gateway to place the current call on hold and (ii) commanding the cross-connect to connect the local communication device to the CO to answer the incoming call.

15. The invention of claim 13, wherein the controller further responds to a conference-call connect command (CCCC) from the local communication device by configuring the cross-connect to connect the local communication device to both the CO and the VoBB gateway to establish a conference call.

16. The invention of claim 11, wherein the controller, upon detecting an incoming call from the VoBB gateway while the local communication device is in a current call via the CO, is adapted to assert a CW tone to the local communication device.

17. The invention of claim 16, wherein the controller further is adapted to respond to a CWCC from the local communication device by (i) commanding the CO to place the current call on hold and (ii) commanding the cross-connect to connect the local communication device to the VoBB gateway to answer the incoming call.

18. The invention of claim 16, wherein the controller further is adapted to respond responds to a CCCC from the local communication device by configuring the cross-connect to connect the local communication device to both the CO and the VoBB gateway to establish a conference call.

19. A method for processing one or more communication signals at a customer's premises, comprising the step of:
(a) selectively connecting a local communication device with a plain old telephone system (POTS) central office (CO) or a voice-over-broadband (VoBB) gateway or both;
(b) monitoring one or more user-initiated signals provided by the local communication device; and
(c) based on the one or more user-initiated signals, determining whether to connect the local communication device with the POTS CO or the VoBB gateway or both,
wherein step (c) comprises the step of determining whether to connect the local communication device to the POTS CO or to the VoBB gateway or both based on one or more voice commands provided to the local communication device, the one or more voice commands spoken by a user and processed by speech recognition.

20. The invention of claim 19, wherein step (c) comprises the step of determining whether to connect the local communication device to the POTS CO or to the VoBB gateway or both based on one or more Dual-Tone-Multi-Frequency (DTMF) signals from the local communication device.

21. The invention of claim 20, wherein step (c) comprises the step of connecting the local communication device to the POTS CO when the one or more user-initiated signals from the local communication device correspond to the dialing of a 9-1-1 sequence on the local communication device.

22. The invention of claim 19, further comprising the step of connecting the local communication device to the POTS CO upon loss of power to the VoBB gateway.

23. The invention of claim 19, wherein step (c) comprises the step of determining whether to connect the local communication device to the POTS CO or to the VoBB gateway or both based on one or more signals from at least one of the POTS CO and the VoBB gateway.

24. The invention of claim 23, further comprising:
connecting the local communication device to answer an incoming call arriving from either the POTS CO or the VoBB gateway, if there is no call already in progress;
asserting a call-waiting (CW) tone to the local communication device, upon detecting an incoming call from the CO while the local communication device is in a current call via the VoBB gateway; and
asserting a CW tone to the local communication device upon detecting an incoming call from the VoBB gateway while the local communication device is in a current call via the CO.

* * * * *